(12) United States Patent
Bowers et al.

(10) Patent No.: US 8,751,433 B2
(45) Date of Patent: Jun. 10, 2014

(54) EFFICIENT PROBABILISTIC REASONING OVER SEMANTIC DATA

(75) Inventors: Stuart M. Bowers, Redmond, WA (US); Thomas E. Jackson, Redmond, WA (US); Silvia C. Vega, Seattle, WA (US); Chris D. Karkanias, Sammamish, WA (US); Allen L. Brown, Jr., Bellevue, WA (US); David G. Campbell, Sammamish, WA (US); Brian S. Aust, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 553 days.

(21) Appl. No.: 12/968,289

(22) Filed: Dec. 15, 2010

(65) Prior Publication Data

US 2012/0158636 A1    Jun. 21, 2012

(51) Int. Cl.
*G06N 5/02*    (2006.01)
(52) U.S. Cl.
CPC .................................. *G06N 5/02* (2013.01)
USPC ............................................................. 706/50
(58) Field of Classification Search
USPC .............................. 706/50; 726/1, 2; 707/100
See application file for complete search history.

(56) References Cited

U.S. PATENT DOCUMENTS

| | | | |
|---|---|---|---|
| 6,292,771 B1 | 9/2001 | Haug et al. | |
| 6,917,943 B2 | 7/2005 | Butler | |
| 7,328,216 B2 | 2/2008 | Hofmann et al. | |
| 7,567,946 B2 | 7/2009 | Andreoli et al. | |
| 7,865,526 B2 | 1/2011 | Butler | |
| 8,272,025 B1* | 9/2012 | Burnham et al. | 726/1 |
| 2008/0082782 A1 | 4/2008 | Meijer et al. | |
| 2010/0070448 A1 | 3/2010 | Omoigui | |
| 2010/0114885 A1 | 5/2010 | Bowers et al. | |

OTHER PUBLICATIONS

Hofmann, Thomas, "Probabilistic Latent Semantic Analysis," retrieved at <<http://citeseerx.ist.psu.edu/viewdoc/download-?doi=10.1.1.84.1137&rep=rep1&type=pdf>>, Proceedings of the Fifteenth Conference on Uncertainty in Artificial Intelligence (UAI), 1999, 8 pages.

Fensel, et al., "Towards LarKC: A Platform for Web-Scale Reasoning," retrieved at <<http://www.larkc.eu/wp-content/uploads/2008/05/larkc-icsc08.pdf>>, Proceedings of the 2008 IEEE International Conference on Semantic Computing (ICSC), Aug. 2008, 6 pages.

Butler, "Data Wrangling with the SheafSystem™ ", in Proceedings of the Twelfth Annual Scientific Computing with Python Conference (SciPy 2013), Jun. 2013, 34 pages.

Butler, "Scientific Computing Doesn't Need noSQL", In Proceedings of Supercomputing 2012—Workshop on High Performance Computing meets Databases (HPCDB), Published in 2012 SC Companion: High Performance Computing, Networking, Storage and Analysis (SCC 2012), Nov. 2012, 2 pages.

(Continued)

*Primary Examiner* — Jeffrey A Gaffin
*Assistant Examiner* — Ola Olude Afolabi
(74) *Attorney, Agent, or Firm* — Damon Rieth; Jim Ross; Micky Minhas

(57) ABSTRACT

A semantic reasoning engine is described for performing probabilistic reasoning over a semantic graph in a time-efficient and viable manner. The semantic reasoning engine includes a data store that provides the semantic graph, where the semantic graph is formed by a plurality of concepts connected together via probabilistic assertions. The semantic reasoning engine operates by providing an answer to a query by recursively collapsing the semantic graph based on at least one collapsing rule.

20 Claims, 17 Drawing Sheets

(56) References Cited

OTHER PUBLICATIONS

Butler, "The Sheaf Data Model: A Rigorous Data Model for Scientific Computing", In Proceedings of Supercomputing 2012—Workshop on High Performance Computing meets Databases (HPCDB), Published in 2012 SC Companion: High Performance Computing, Networking, Storage and Analysis (SCC 2012), Nov. 2012, 3 pages.

Butler, "A Brief History of the Sheaf Data Model", Available at http://www.linnitpoint_com/images/Publications/SHDMHIST.pdf, Aug. 2011, 39 pages.

Butler, "Sheaf Data Model: Context and Overview", Available at http://www.limitpoint.com/images/Publications/sdm_context_and_overview.pdf, Oct. 2012, 30 pages.

Butler, "Part Space: A Non-Mathematical Introduction to the Concepts of the Sheaf Data Model", Available at <<http://www.limitpoint.com/images/Publications/PartSpace.pdf>>, Feb. 2013, 16 pages.

Butler, "Part Spaces for Scientific Computing", Available at <<http://www.limitpoint.com/images/Publications/PartSpacesForScientificComputing.pdf>>, Feb. 2013, 23 pages.

Butler, "Sheaf System Analysis and Design Tutorial", Available at <<http://www.limitpoint.com/images/Publications/Sheaf%20System%20Analysis%20and%20Design%20Tutorial.pdf, >>, Apr. 2013, 46 pages.

Butler, "The Sheaf Data Model, Part 1: Objects", Available at <<http://www.limitpoint.com/images/Publications/The%20Sheaf%20Data%20Model.pdf>>, Oct. 2012, 33 pages.

Butler et al, "The Visualization Management System Approach to Visualization in Scientific Computing", Computers in Physics, Sep. 1989, 5 pages.

Butler et al., "A Visualization Model Based on the Mathematics of Fiber Bundles", Computers in Physics, Sep. 1989, 7 pages.

Butler et al., "Vector-Bundle Classes Form Powerful Tool for Scientific Visualization", Computers in Physics, vol. 6, No. 6, Nov. 1992, 9 pages.

Shapiro, "Maintenance of Geometric Representations through Space Decompositions", International Journal of Computational Geometry & Applications, vol. 7, No. 1/2, Feb. 1997, 31 pages.

Benger, "On Safari in the File Format Jungle—Why Can't You Visualize My Data?", Computing in Science and Engineering, vol. 11, No. 6, Nov. 2009, 5 pages.

Haber et al., "A Data Model for Scientific Visualization with Provisions for Regular and Irregular Grids", In Proceedings of the IEEE Conference on Visualization 1991, Oct. 1991, 8 pages.

Spivak, "Functorial Data Migration", Available at <<http://arxiv.org/abs/1009.1166v2>>, Sep. 2010, 35 pages.

Spivak et al., "Ologs: A Categorical Framework for Knowledge Representation", Available at <<http://arxiv.org/abs/1102.1889v2>>, Aug. 2011, 52 pages.

* cited by examiner

| A B C D E | T/F | p(A) | p(B) | p(C) | p(D) | p(E) | Total Prob | True Prob |
|---|---|---|---|---|---|---|---|---|
| T T T T T | T | 0.99 | 0.9 | 0.98 | 0.95 | 0.7 | 0.5806647 | 0.5806647 |
| T T T T F | T | 0.99 | 0.9 | 0.98 | 0.95 | 0.3 | 0.2488563 | 0.2488563 |
| T T T F T | T | 0.99 | 0.9 | 0.98 | 0.05 | 0.7 | 0.0305613 | 0.0305613 |
| T T T F F | T | 0.99 | 0.9 | 0.98 | 0.05 | 0.3 | 0.0130977 | 0.0130977 |
| T T F T T | F | 0.99 | 0.9 | 0.02 | 0.95 | 0.7 | 0.0118503 | 0.0 |
| T T F T F | F | 0.99 | 0.9 | 0.02 | 0.95 | 0.3 | 0.0050787 | 0.0 |
| T T F F T | F | 0.99 | 0.9 | 0.02 | 0.05 | 0.7 | 0.0006237 | 0.0 |
| T T F F F | F | 0.99 | 0.9 | 0.02 | 0.05 | 0.3 | 0.0002673 | 0.0 |
| T F T T T | T | 0.99 | 0.1 | 0.98 | 0.95 | 0.7 | 0.0645183 | 0.0645183 |
| T F T T F | F | 0.99 | 0.1 | 0.98 | 0.95 | 0.3 | 0.0276507 | 0.0 |
| T F T F T | F | 0.99 | 0.1 | 0.98 | 0.05 | 0.7 | 0.0033957 | 0.0 |
| T F T F F | F | 0.99 | 0.1 | 0.98 | 0.05 | 0.3 | 0.0014553 | 0.0 |
| T F F T T | F | 0.99 | 0.1 | 0.02 | 0.95 | 0.7 | 0.0013167 | 0.0 |
| T F F T F | F | 0.99 | 0.1 | 0.02 | 0.95 | 0.3 | 0.0005643 | 0.0 |
| T F F F T | F | 0.99 | 0.1 | 0.02 | 0.05 | 0.7 | 0.0000693 | 0.0 |
| T F F F F | F | 0.99 | 0.1 | 0.02 | 0.05 | 0.3 | 0.0000297 | 0.0 |
| F T T T T | T | 0.01 | 0.9 | 0.98 | 0.95 | 0.7 | 0.0058653 | 0.0058653 |
| F T T T F | F | 0.01 | 0.9 | 0.98 | 0.95 | 0.3 | 0.0025137 | 0.0 |
| F T T F T | F | 0.01 | 0.9 | 0.98 | 0.05 | 0.7 | 0.0003087 | 0.0 |
| F T T F F | F | 0.01 | 0.9 | 0.98 | 0.05 | 0.3 | 0.0001323 | 0.0 |
| F T F T T | F | 0.01 | 0.9 | 0.02 | 0.95 | 0.7 | 0.0001197 | 0.0 |
| F T F T F | F | 0.01 | 0.9 | 0.02 | 0.95 | 0.3 | 0.0000513 | 0.0 |
| F T F F T | F | 0.01 | 0.9 | 0.02 | 0.05 | 0.7 | 0.0000063 | 0.0 |
| F T F F F | F | 0.01 | 0.9 | 0.02 | 0.05 | 0.3 | 0.0000027 | 0.0 |
| F F T T T | T | 0.01 | 0.1 | 0.98 | 0.95 | 0.7 | 0.0006517 | 0.0006517 |
| F F T T F | F | 0.01 | 0.1 | 0.98 | 0.95 | 0.3 | 0.0002793 | 0.0 |
| F F T F T | F | 0.01 | 0.1 | 0.98 | 0.05 | 0.7 | 0.0000343 | 0.0 |
| F F T F F | F | 0.01 | 0.1 | 0.98 | 0.05 | 0.3 | 0.0000147 | 0.0 |
| F F F T T | F | 0.01 | 0.1 | 0.02 | 0.95 | 0.7 | 0.0000133 | 0.0 |
| F F F T F | F | 0.01 | 0.1 | 0.02 | 0.95 | 0.3 | 0.0000057 | 0.0 |
| F F F F T | F | 0.01 | 0.1 | 0.02 | 0.05 | 0.7 | 0.0000007 | 0.0 |
| F F F F F | F | 0.01 | 0.1 | 0.02 | 0.05 | 0.3 | 0.0000003 | 0.0 |
| | | | | | | TOTAL | 1.0 | 0.9442153 |

FIG. 15

EFFICIENT PROBABILISTIC REASONING OVER SEMANTIC DATA

BACKGROUND

A semantic graph can be formulated in which nodes represent concepts and edges represent probabilistic assertions pertaining to the concepts. For example, such a graph may include a first node pertaining to the concept of "Seattle" a second node pertaining to concept of "Specialist XYZ." An edge connecting these two nodes can identify the probability that Seattle is home to at least one doctor who is a specialist in field XYZ.

In addition to the knowledge that is directly conveyed by individual edges, a user may attempt to perform probabilistic reasoning over multiple edges in the semantic graph. However, present-day technology does not provide efficient mechanisms for performing this task. Indeed, present-day solutions quickly become intractable with an increase in the number of edges under consideration.

SUMMARY

According to one illustrative implementation, a semantic reasoning engine is described for performing probabilistic reasoning over a semantic graph in a time-efficient and viable manner. The semantic reasoning engine operates by providing an answer to a query by recursively collapsing the semantic graph based on at least one collapsing rule.

According to another illustrative feature, the semantic reasoning engine may, prior to successively collapsing the semantic graph, extract the semantic graph from a larger graph by removing extraneous semantic content from the larger graph that is not pertinent to the query.

According to another illustrative feature, one of the collapsing rules is a series-type collapsing rule that specifies that two edges can be combined if the two edges are connected in series in a manner that is independent of other edges in the semantic graph, in the context of a specific line of inference.

According to another illustrative feature, one of the collapsing rules is a parallel-type collapsing rule that specifies that two edges can be combined if the two edges are connected in parallel in a manner that is independent of other edges in the semantic graph, in the context of a specific line of inference.

According to another illustrative feature, the recursive collapsing operation produces a remaining graph. In one case, the remaining graph has no non-collapsed edges, in which case the answer is provided by a probability associated with a final edge in the remaining graph.

In another case, the remaining graph has non-collapsed edges. Here, the semantic reasoning engine can perform probabilistic reasoning over the remaining graph using a world-state-expansion technique. This world-state analysis is rendered viable due to the prior reduction in the number of edges produced by the recursive collapsing operation described above.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 15 shows an enumeration of world states (and associated probabilities) associated with the semantic graph of FIG. 14.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative semantic reasoning engine for performing probabilistic reasoning over a semantic graph by means of a recursive collapsing technique. Section B describes illustrative methods which explain the operation of the semantic reasoning engine of Section A. Section C describes illustrative processing functionality that can be used to implement any aspect of the features described in Sections A and B.

Figure 21:
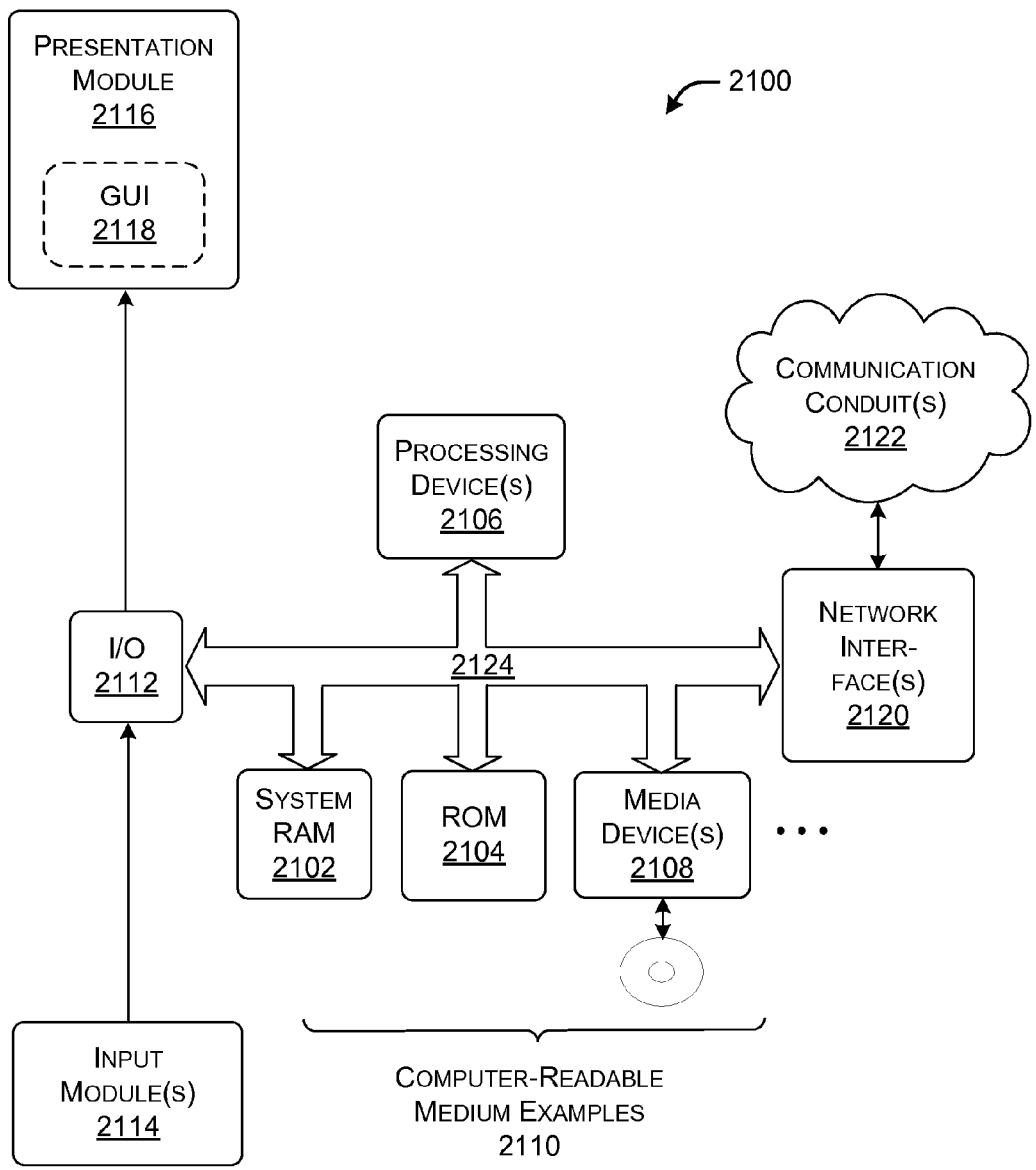
FIG. 21 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms (e.g., using hardware, software, firmware, etc., or any combination thereof). In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 21, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms (e.g., using hardware, software, firmware, etc., or any combination thereof).

As to terminology, the phrase "configured to" encompasses any way that any kind of physical and tangible functionality can be constructed to perform an identified operation. The functionality can be configured to perform an operation using, for instance, software, hardware, firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware, firmware, etc., and/or any combination thereof. When implemented by a computing system, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

A. Illustrative Semantic Reasoning Engine

Figure 1:
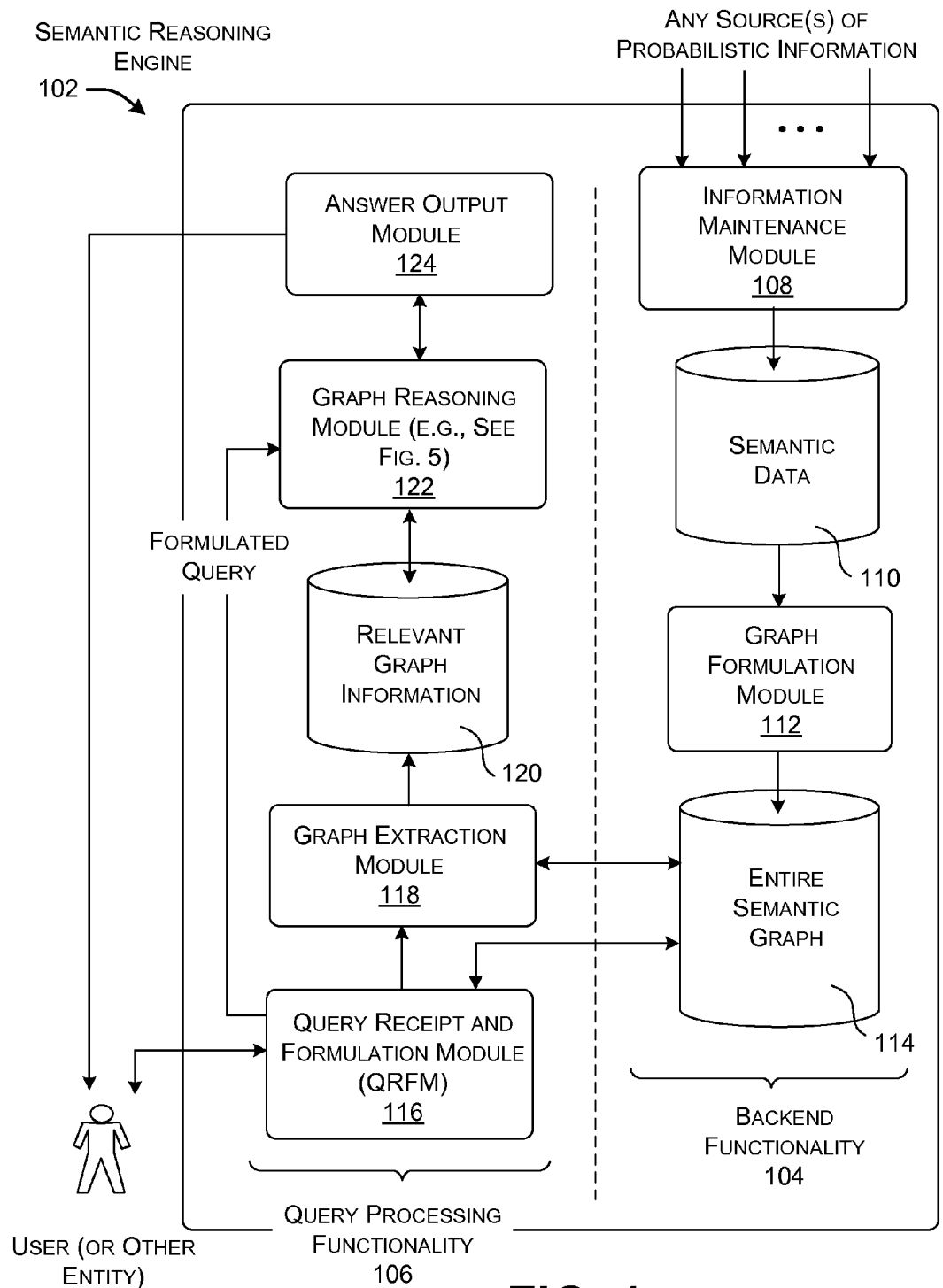
FIG. 1 shows an illustrative semantic reasoning engine for performing probabilistic reasoning over a semantic graph.

FIG. 1 shows an illustrative semantic reasoning engine 102 for performing probabilistic reasoning over a semantic graph. The nodes of a semantic graph correspond to respective concepts. The edges of the semantic graph represent probabilistic assertions. For example, advancing briefly to FIG. 6, a node "Stuart" in the semantic graph 600 is connected to a node "GameEvt01" by an edge associated with an event labeled "Has GameEvent." In conversational terms, this edge indicates that there is a probability of 0.99 that a person named Stuart has played a first game.

Returning to FIG. 1, the semantic reasoning engine 102 attempts to generate an answer to a query by mining the probabilistic information provided in the semantic graph. The semantic reasoning engine 102 performs this task by recursively collapsing the semantic graph to eventually produce a remaining graph with a reduced number of edges (and, indeed, possibly a single edge). The semantic reasoning engine 102 can then extract an answer to the query based on the remaining graph. The process of recursively collapsing edges renders the reasoning process time-efficient and viable for the reasons set forth in greater detail below.

The semantic reasoning engine 102 can be conceptualized as including backend functionality 104 and query processing functionality 106. The backend functionality 104 creates and maintains a semantic graph based on collected semantic data. The query processing functionality 106 uses the semantic graph to answer queries by a user (or any other entity, including non-human functional agents). The following explanation describes the individual features within the backend functionality 104 and the query processing functionality 106.

Starting with the backend functionality 104, an information maintenance module 108 can receive semantic data from any number of sources and store the semantic data in one or more data stores 110 (referred to in the singular below for brevity). As used herein, the term semantic data corresponds to any information used to populate a semantic graph, including information pertaining to the concepts expressed in the graph, information regarding the events which connect the concepts together, and information regarding the probabilities assigned to the events. A graph formulation module 112 can then create a semantic graph based on the collected data. The graph formulation module 112 can store the semantic graph in one or more data stores 114 (referred to in the singular below for brevity).

One source of probabilistic information may correspond to any equipment that generates measurements having a level of uncertainty associated therewith. Another source of probabilistic information may correspond to historical records that describe the prior variable occurrence of some phenomenon. Another source of probabilistic information can correspond to survey results or the like. Another source of probabilistic information can correspond to manual assessments of likelihoods made by human experts (or any other appropriate individuals). Another source of probabilistic information can correspond to behavioral patterns exhibited by a population of users (e.g., corresponding to the click-through behavior of users who interact with web sites), and so on. Another source of probabilistic information can correspond to studies of any nature, such as epidemiological studies, etc. These examples are presented by way of illustration, not limitation; generally stated, the graph formulation module 112 can assign probabilities to edges based on probabilistic evidence collected from any source or combination of sources, using any technique or combination of techniques.

In one scenario, semantic reasoning engine 102 can use the graph formulation module 112 to formulate a semantic graph that pertains to a single focused topic or a collection of focused topics. In another case, the graph formulation module 112 can formulate a semantic graph that has no restrictions as to subject matter. Generally stated, the graph formulation module 112 can apply any policy or collection of policies in accepting content to be added to the semantic graph.

Figure 6:
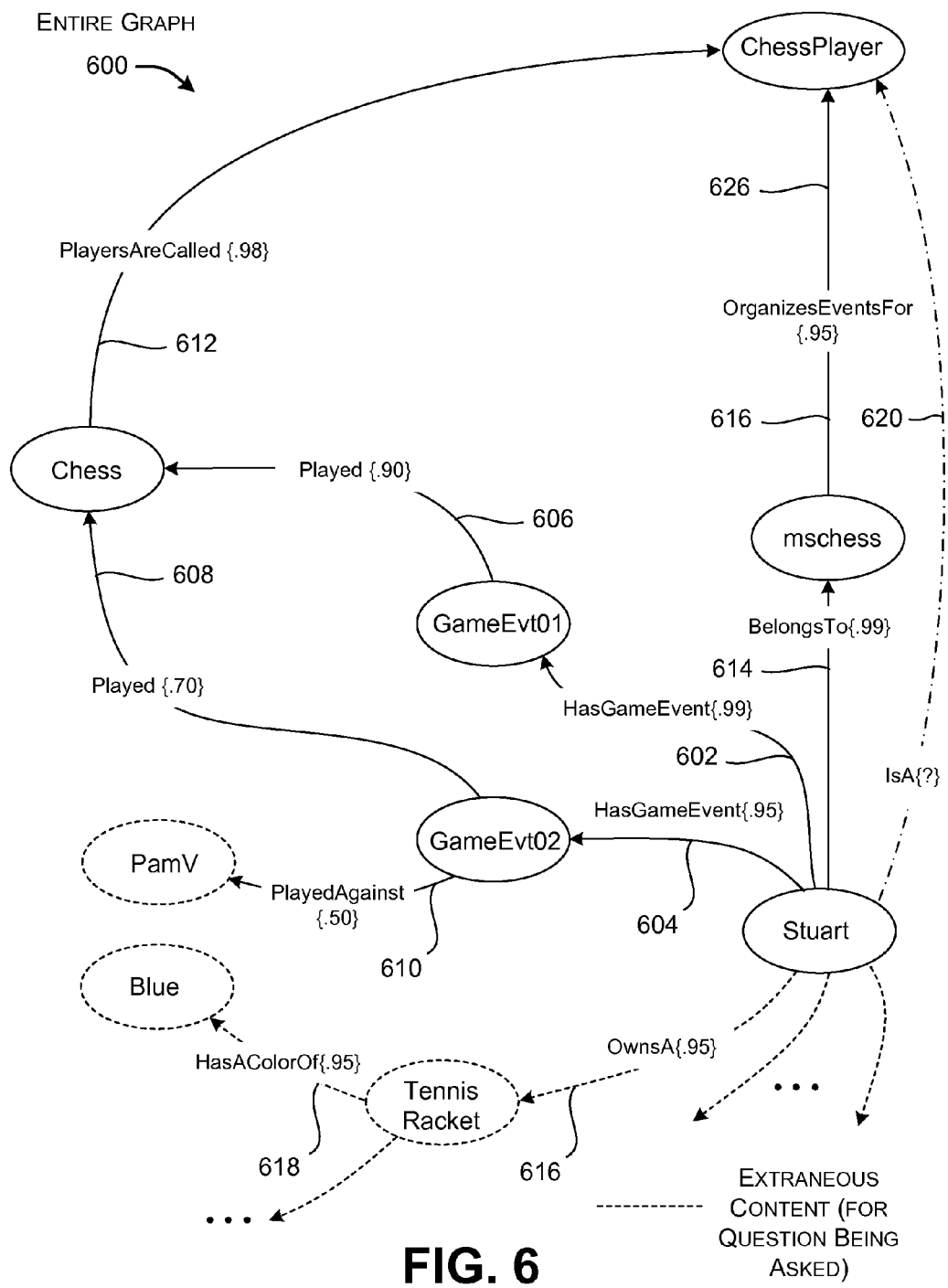
FIG. 6 shows an example of an entire semantic graph, including content that is extraneous to a particular query.

The graph formation module 112 can construct the semantic graph using any type of data structure. In the example of FIG. 6, the graph formulation module 112 constructs the semantic graph 600 as a collection of nodes that are connected together via edges. The semantic graph 600 can be considered as a directed graph because each edge points from a source node to a target node.

Now advancing to the query processing functionality 106, a query receipt and formulation module (QRFM) 116 receives a query from the user or other entity. Generally, the query identifies the knowledge that the user (or other entity) wishes to extract from the semantic graph. For example, a particular query may ask the probability that hospitals in the city of Portland have treated patients with the flu in the last year.

In one implementation, the semantic reasoning engine 102 uses an internal query syntax to extract information from the semantic graph, such as a query syntax defined, without limitation, by the language Prolog, or the language SPARQL, etc. In one scenario, the user can submit his or her query in the form specified by the internal query syntax used by the semantic reasoning engine 102. In this case, the QRFM 116 can operate on the user's query without modification.

In another case, the user can submit his or her query in a form that differs from the internal query syntax. For example, in one case, the user can express his or her question in a high-level conversation style. In another case, the user can express his or her query by clicking on a link associated with a particular question, or by clicking on one or more nodes or edges in a graphical depiction of a semantic graph. In another case, the user can express his or her query in an implicit and indirect manner based on his or her behavior. For example, the user may repeatedly click on one or more encyclopedia entries, product pages, news stories, etc. Based thereon, the QRFM 116 can deduce one or more implicit queries that the user may be attempting to answer. In any of these circumstances, the QRFM 116 can translate the user's query into the internal query syntax of the semantic reasoning engine 102. The examples which follow will clarify the manner in which such a translation can be performed.

In still other scenarios, the entity which submits a query may correspond to a non-human agent. For example, the entity which submits a query may correspond to a functional module within a system. That module may request information that has a bearing on its manner of operation. For example, a component which transmits data may seek to determine the probability of encountering network congestion at different times of the day. However, so as not to unduly complicate the following explanation, the query which drives the probabilistic reasoning is identified as a user query.

Upon receipt of the query, a graph extraction module 118 identifies content in the semantic graph (stored in the data store 114) that has a bearing on the question and content that is extraneous to the question. The graph extraction module 118 can then eliminate (or otherwise factor out) the content that is considered extraneous. As a result, the graph extraction module 118 may produce a modified semantic graph which it can store in one or more data stores 120 (referred to in the singular below for brevity). To simplify explanation, the modified semantic graph that is stored in the data store 120 is referred to as a semantic graph (e.g., without the "modified" qualifier).

A graph reasoning module 122 performs the core function of the semantic reasoning engine 102 by deriving an answer to the user's query. From a high-level perspective, the graph reasoning module 122 performs this task by recursively collapsing edges in the semantic graph, each time producing a remaining graph in the terminology used herein. In one case, the graph reasoning module can collapse the semantic graph into a single edge that connects two nodes. In this case, the graph reasoning module 122 can directly formulate an answer based on a probability associated with the final edge. In a second scenario, the graph reasoning module 122 collapses the semantic graph into a remaining graph that includes a set of edges that cannot be collapsed. In this case, the graph reasoning module 122 can formulate an answer to the query by enumerating world states within the remaining graph (in the manner to be described below).

In both of these scenarios, the edge-collapsing operation enables the graph reasoning module 122 to reduce the complexity of the semantic graph. And in doing so, the semantic reasoning engine 102 can generate an answer to a user query in a time-efficient and a resource-efficient manner. Note that the complexity of probabilistic reasoning using the world-state-expansion technique (to be described below) grows in exponential fashion with a number N of edges in the semantic graph, e.g., $2^N$. This means that, without the recursive collapsing operation, it may be impractical to perform probabilistic reasoning over a semantic graph having many edges.

Finally, an answer output module 124 can convey the answer generated by the graph reasoning module 122 to the user.

As a final note with respect to FIG. 1, the semantic reasoning engine 102 can perform aspects of the processing described above in advance of the receipt of a query. For example the semantic reasoning engine 102 can anticipate that a significant population of users may ask certain questions. In response, the semantic reasoning engine 102 can pre-compute and store the answers to the questions using the processing described above. Then, if a user asks one of these questions, the query processing functionality 106 can immediately forward it to the user. In a similar vein, the semantic reasoning engine 102 can collapse parts of a semantic graph in a pre-processing operation based on an expectation that those parts will be used in answering a certain class of queries.

Figure 2:
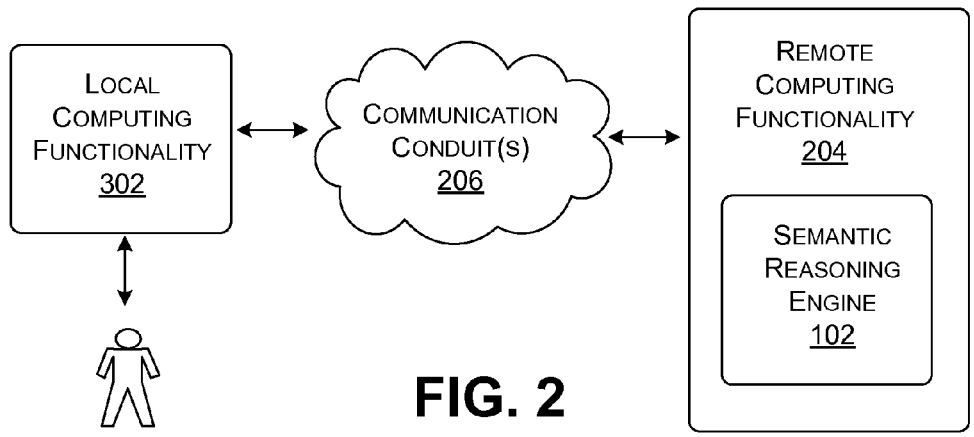
FIGS. 2-4 show three different illustrative implementations of the semantic reasoning engine of FIG. 1.
Figure 3:
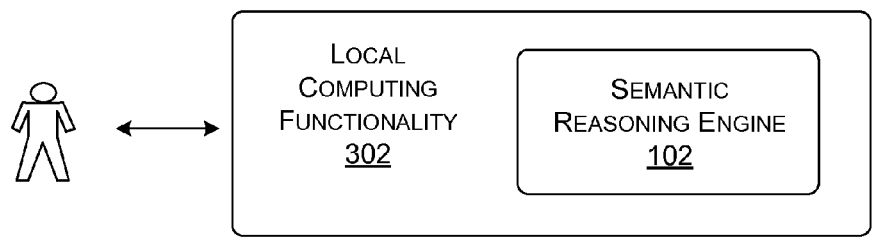
Figure 4:
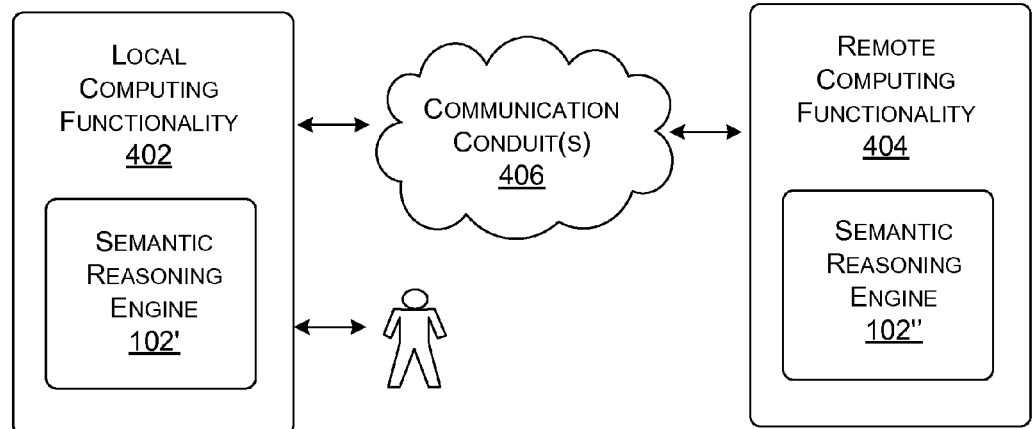

FIGS. 2-4 describe three possible implementations of the semantic reasoning engine 102 of FIG. 1. These implementations are representative, rather than exhaustive. In the first case, a user can use local computing functionality 202 to access the semantic reasoning engine 102, which is deployed by remote computing functionality 204. That is, the user may use the local computing functionality 202 to submit a query to the semantic reasoning engine 102 and receive an answer back from the semantic reasoning engine 102. Any type of network 206 may couple the local computing functionality 202 to the remote computing functionality 204, such a local area network, a wide area network (e.g., the Internet, and so on).

The local computing functionality 202 may represent any type of computing device, such as, without limitation, a personal computer, a workstation device, a personal digital assistant device, a telephone device, an ebook reader device, a tablet-type computing device, a game console device, a set-top box device, and so on. The remote computing functionality 204 may correspond to one or more server-type computing devices, one or more data stores, routing functionality, and so on. The resources associated with the remote computing functionality 204 can be provided at a single site or distributed over plural sites.

FIG. 3 shows an example in which local computing functionality 302 implements the semantic reasoning engine 102 as a local resource. The local computing functionality 302 can correspond to any of the computing devices described above with respect to FIG. 2.

FIG. 4 shows an example which is the same as FIG. 2, e.g., in which local computing functionality 402 is coupled to remote computing functionality 404 via one or more networks 406. In this case, however, the functionality associated with the semantic reasoning engine 102 can be distributed between the local computing functionality 402 and the remote computing functionality 404, e.g., by providing semantic reasoning engine functionality 102' at the local computing functionality 402 and semantic reasoning engine functionality 102" at the remote computing functionality 404. For example, the local computing functionality 402 can implement aspects of the query processing functionality 106, while the remote computing functionality 404 can implement aspects of the backend functionality 104.

Figure 5:
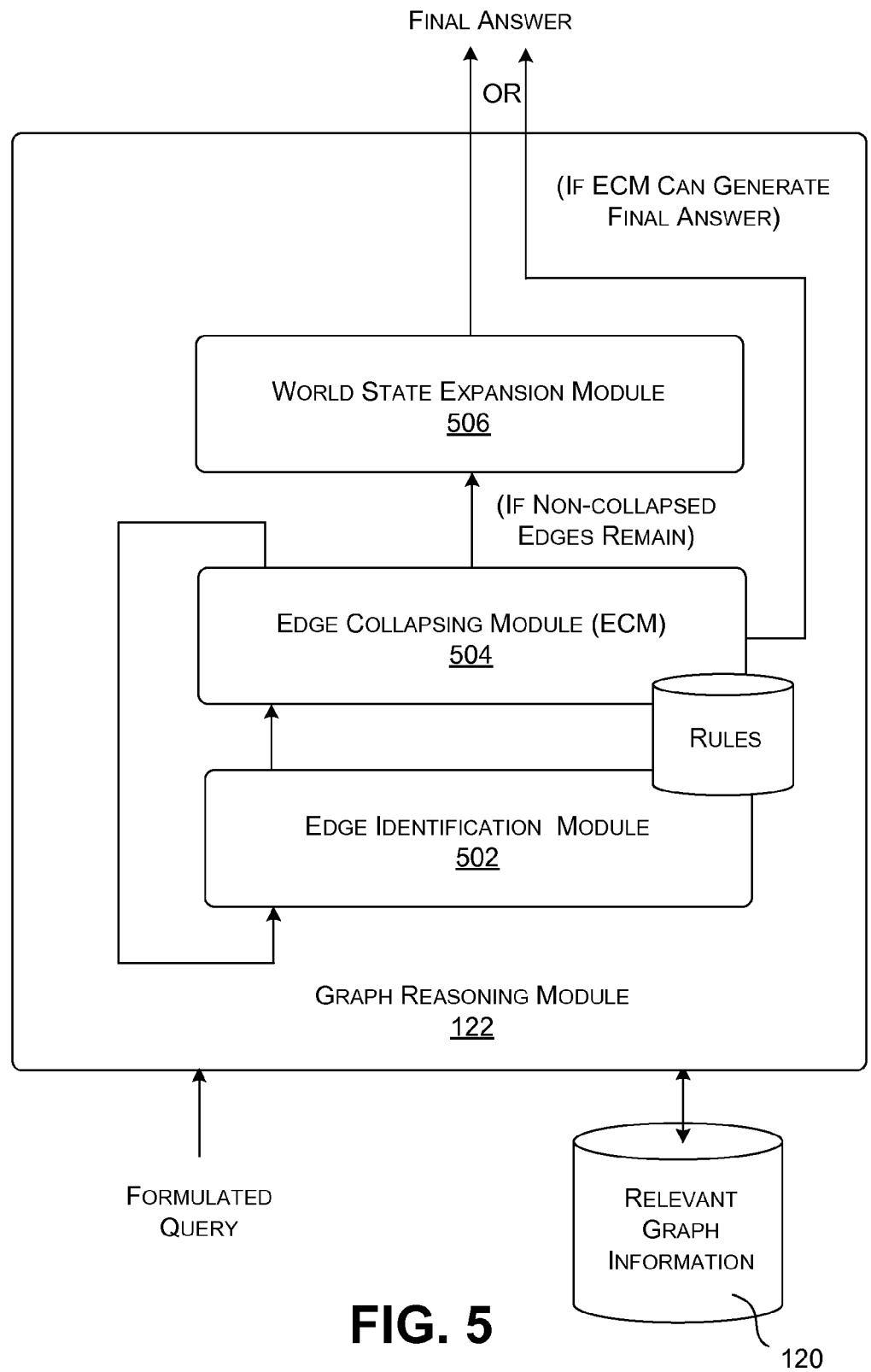
FIG. 5 shows a graph reasoning module for use in the semantic reasoning engine of FIG. 1.

FIG. 5 shows one implementation of the graph reasoning module 122 of FIG. 1. The graph reasoning module 122 performs probabilistic reasoning over a semantic graph in the context of a particular query. The graph reasoning module 122 can include an edge identification module 502 that, once invoked, can identify a pair of edges that can be collapsed (if such a pair exists), in the context of a particular line of inquiry associated with a query. An edge collapsing module 504 then collapses the identified pair of edges into a single edge. The loop shown in FIG. 5 indicates that the graph reasoning module 122 repeats the edge identification and edge collapsing operations until no additional edges can be collapsed. This yields a remaining graph according to the terminology used herein. A world state expansion module 506 can then determine an answer to the query by processing the remaining graph using a world-state-expansion technique. Alternatively, if the remaining graph has no un-collapsed edges, the graph reasoning module 122 can glean the answer to the query directly from the remaining graph.

The remaining figures in this section set forth a specific example to illustrate the general principles described above. To begin with, consider the semantic graph 600 shown in FIG. 6. The semantic graph 600 represents knowledge pertaining to a plurality of topics. FIG. 6 may depict only a part of a more encompassing semantic graph.

Expressed in conversational terms, edges 602 and 602 convey the likelihoods that a person named Stuart has played two games (associated with nodes GameEvt01 and GameEvt02). Edges 606 and 608 convey the likelihoods that the first game (GameEvt01) and the second game (GameEvt02) correspond to the game of chess. Edge 610 conveys the likelihood that the second game (GameEvt02) was played against a person identified as PamV. Edge 612 indicates the likelihood that people who play a game called chess can be considered to be chess players.

An edge 614 indicates that the person Stuart very likely has an alias "mschess" with a high level of probability. The edge 616 assigns another probability level to the assertion that a person who has the alias "mschess" organizes events for chess players.

Other edges and nodes may express other themes. For example, edge 616 expresses a certain probability that the person named Stuart owns a tennis racket. Edge 618 expresses another probability that the tennis racket has the color of blue. Generally, the probabilities assigned to the edges in FIG. 6 can originate from any source or combination of sources.

Assume that the user (or other agent) wishes to consult the semantic graph to determine the probability that the person named Stuart can be considered a chess player. The dashed-line edge 620 represents this question by linking the node that is labeled "Stuart" with the node that is labeled "Chess-Player."

As a first operation, the QRFM 116 can receive the query in any format. In one case, the query may already be expressed in a form that can be used to investigate the semantic graph 600. In that case, the QRFM 116 need not perform any type of translation. In a second case, the query is not expressed in a form that can be used to directly investigate the semantic graph 600, but the QRFM 116 has already formulated the appropriate syntactical form of the query. In that case, the QRFM 116 can convert the input query into the appropriate form. In a third case, the QRFM 116 can perform analysis on the semantic graph 600 for the purpose of expressing the input query in the appropriate syntactical form.

For example, as to the last-mentioned case, the QRFM 116 can perform translation by first identifying the paths through the semantic graph 600 that can be used to answer the query. These paths can be used to formulate separate query components. For example, a first query component can stipulate that a person who has played a game which is called chess is a chess player. This query component applies to a first path that comprises edges 604, 608, and 612, and a second path that comprises edges 602, 606, and 612. A second query component can stipulate that a person who has an alias pertaining to a game likely plays that game. This query component applies to a third path comprising edges 614 and 616. Edges 610, 616, and 618 do not contribute to any paths that can be used to answer the question, and therefore represent extraneous content.

In one particular and non-limiting implementation, the QRFM 116 can express the first type of path identified above in the following internal SPARQL syntax:

| RULE 1 |
| --- |
| SELECT ?Person ?SportPlayer<br>WHERE {<br>    ?Person <HasGameEvent> ?Event.<br>    ?Event <Played> ?Game.<br>    ?Game <PlayersAreCalled> ?SportPlayer.<br>    FILTER (?SportPlayer = "ChessPlayer")<br>} |

The QRFM 116 can express the second type of path identified above in the SPARQL syntax as follows:

| RULE 2: |
| --- |
| SELECT ?A ?C<br>WHERE{<br>    ?A <BelongsTo> ?B.<br>    ?B <OrganizesEventsFor> ?C.<br>    FILTER (?C = "ChessPlayer")<br>} |

Note that these rules express the concepts associated with nodes in the paths as variables. Such a rule therefore operates as a template or model that can be applied to different paths that match the pattern expressed by the rule. For example, "?A<BelongsTo>?B" in Rule 2 maps to "Stuart"<BelongsTo> the "mschess" alias. The probability associated with the overall question (whether the person named Stuart is a chess player) corresponds to the combined probability that RULE 1 is true or RULE 2 is true.

Having expressed the query in an appropriate form, the graph extraction module 118 begins by removing extraneous content from the semantic graph 600. As described above, the extraneous content corresponds to edges 610, 616, and 618, among other edges not shown in FIG. 6. As a result of this operation, the graph extraction module 118 produces the remaining graph 700 which is shown in FIG. 7.

As this stage, the graph reasoning module 122 begins operating on the remaining graph 700 by successively collapsing pairs of edges. In doing so, the graph reasoning module 122 can apply two rules—a series-type collapsing rule and a parallel-type collapsing rule. The series-type collapsing rule applies when two edges are connected in series in a manner that does not depend on any other edge in the semantic graph, in the context of a particular line of inquiry associated with a query. A parallel-type collapsing rule applies when two edges are connected in parallel in a manner that does not depend on any other edge in the graph, in the context of a particular line of inquiry associated with a query.

Figure 7:
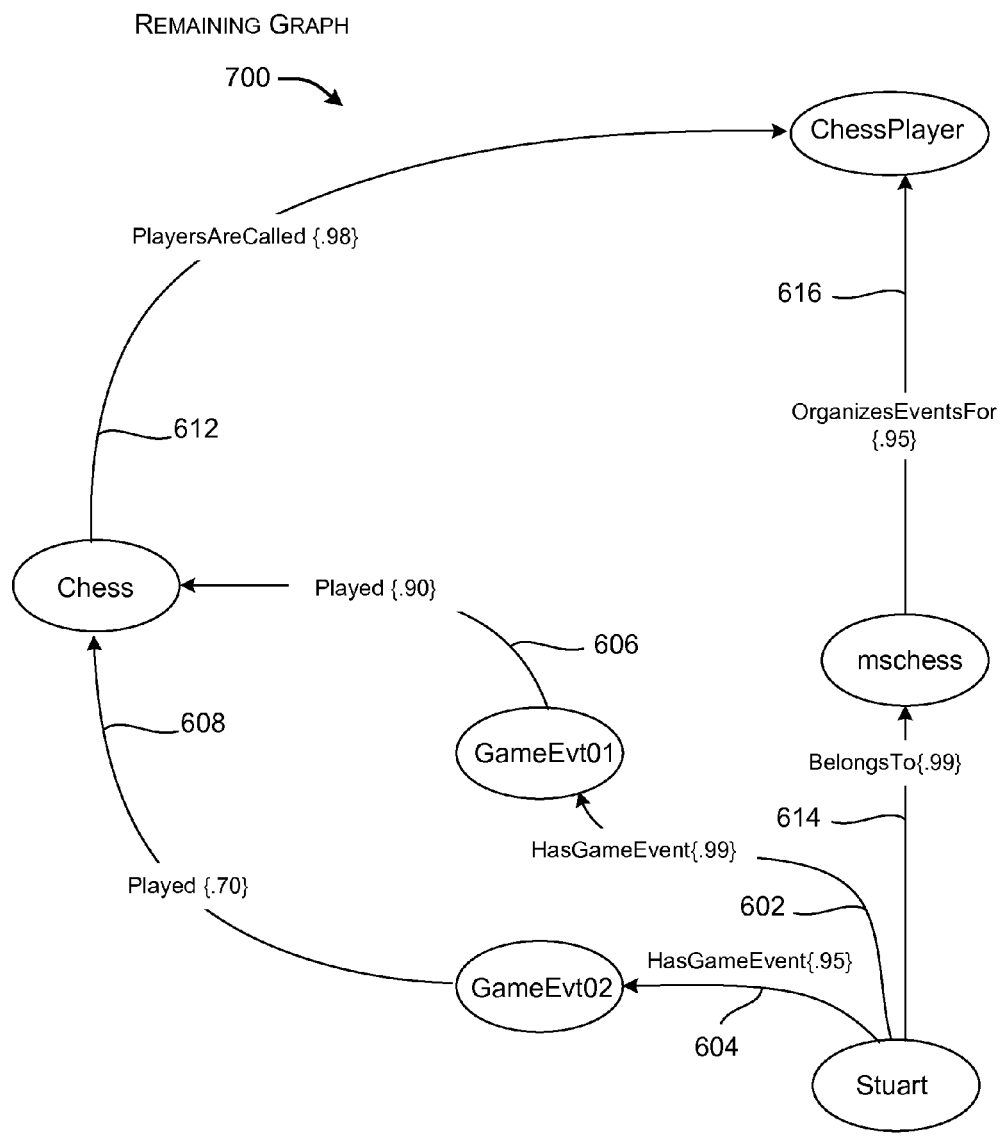
FIG. 7 shows a semantic graph that is produced by removing the extraneous content from the semantic graph of FIG. 6.

In the case of FIG. 7 there are three pairs of edges that can be collapsed using the series-type collapsing rule, namely edges 602 and 606, edges 604 and 608, and edges 604 and 615. As a result of collapsing these edges, the graph reasoning module 113 produces the new edges shown in a remaining graph 800 of FIG. 8. Namely, new edge 802 is produced by collapsing edges 602 and 606, new edge 804 is produced by collapsing edges 604 and 608, and new edge 806 is produced by collapsing edges 614 and 616. In each of these cases, the probability (probability$_{new}$) associated with the resultant new edges can be formed based on the joint probability theorem, namely: probability$_{new}$=proability$_{edge1}$*probability$_{edge2}$. Here, it is assumed that the probability of the first edge is independent of the probability of the second edge.

Figure 8:
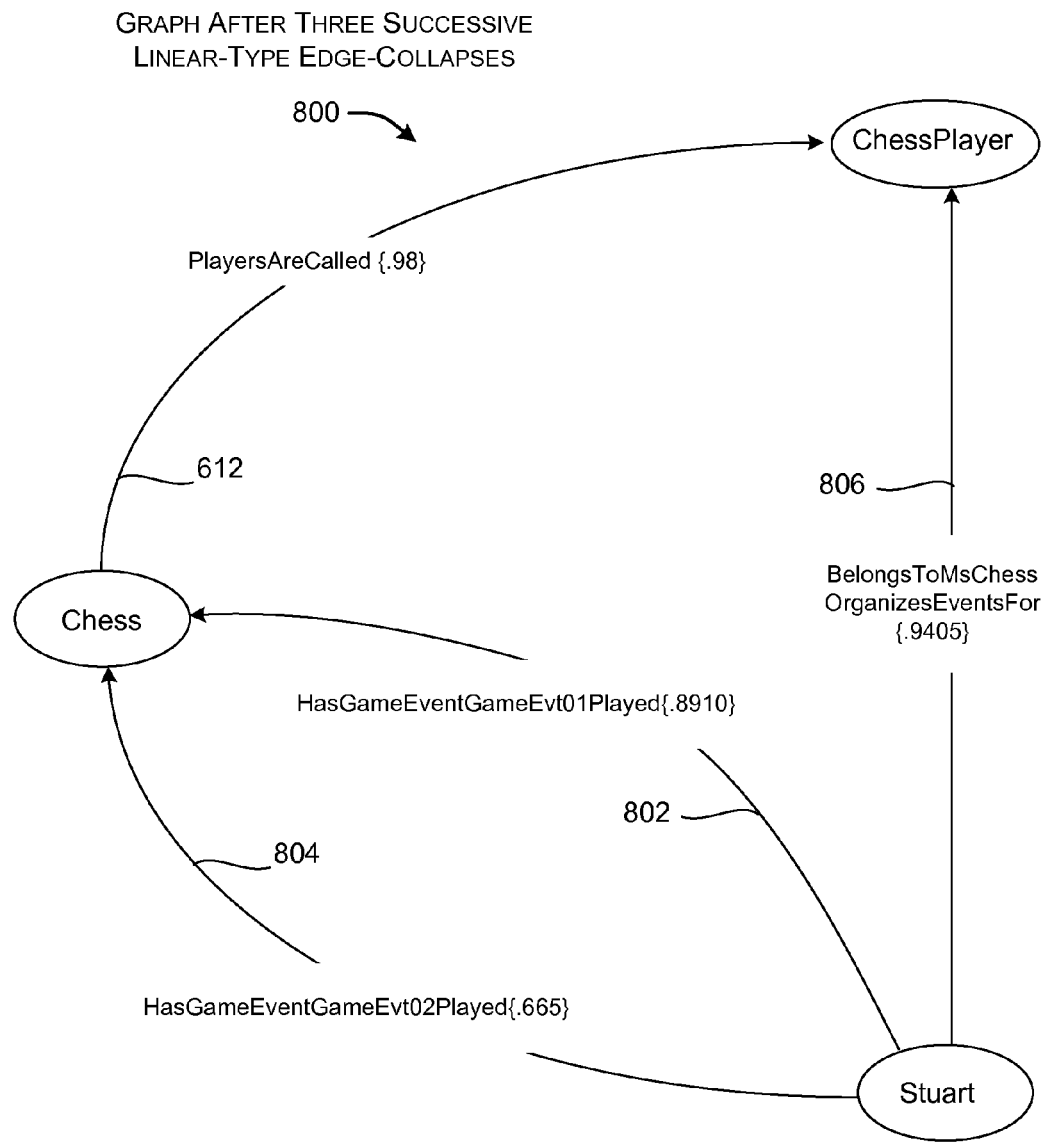
FIGS. 8-11 show remaining graphs that are produced by recursively collapsing edges, starting with the semantic graph of FIG. 7.
Figure 9:
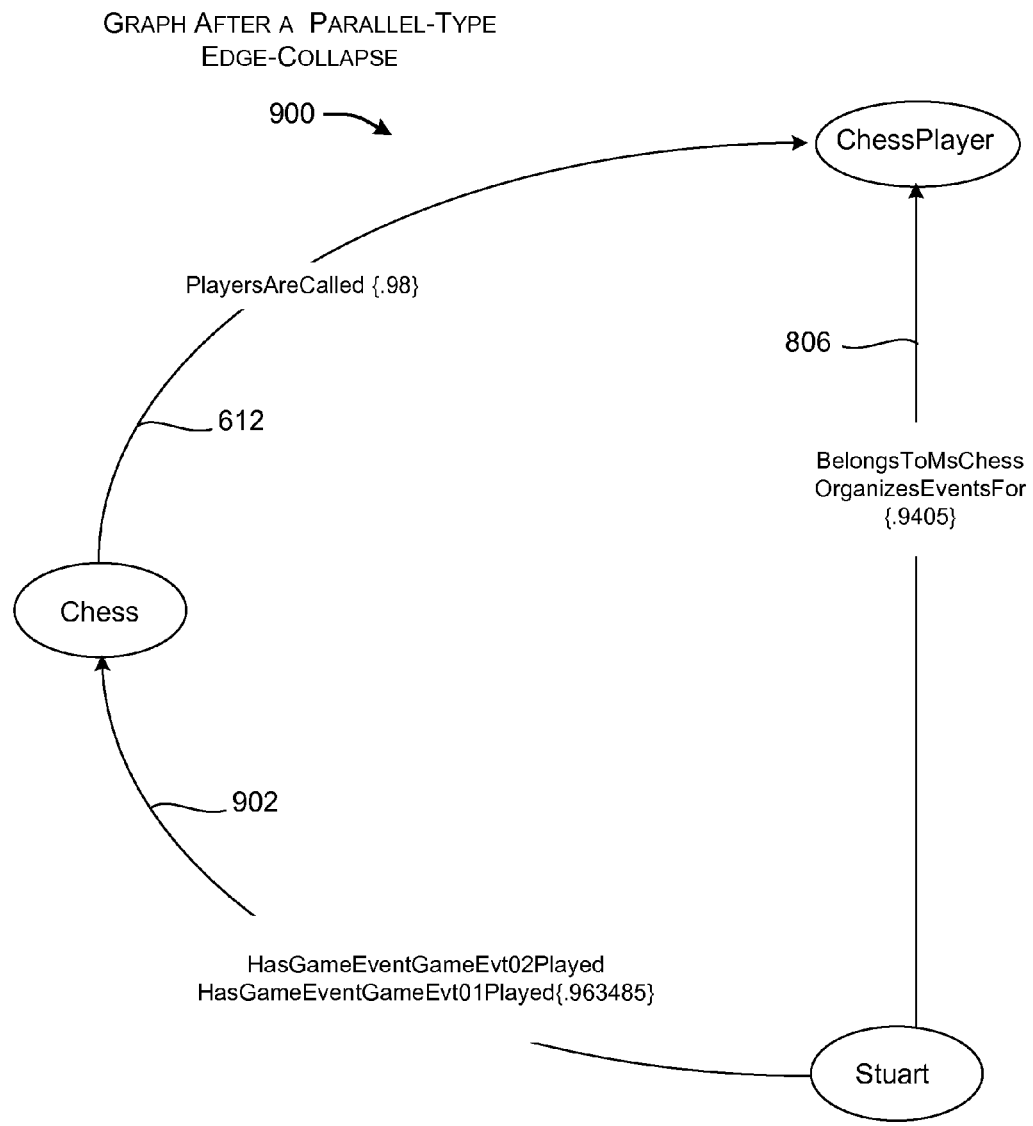

In the state shown in FIG. 8, the remaining graph 800 no longer includes any series-type edges that can be combined. But the remaining graph 800 does contain two edges (802, 804) that can be combined using the parallel-type collapsing rule to produce a new edge 902 shown in a remaining graph 900 of FIG. 9. In this scenario, the probability (probability$_{new}$) of the new edge 902 is formed based on the following Bayes-rule theorem: probability$_{new}$=1−((1−probability$_{edge1}$) *1−probability$_{edge2}$)). In this circumstance, it is again assumed that the probability of the first edge is independent of the probability of the second edge.

Figure 10:
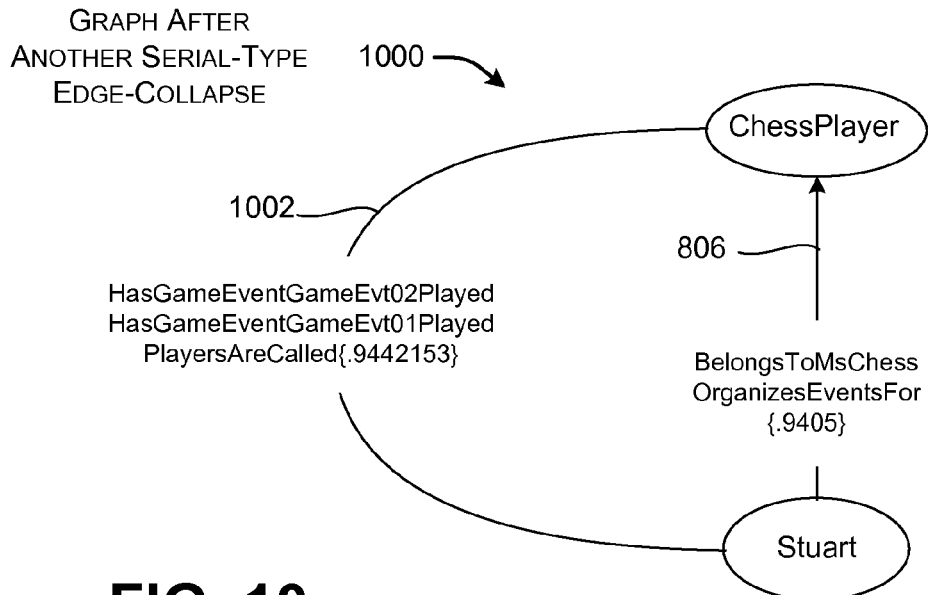

At this juncture, note that edges 902 and 612 are now disposed in series in a manner that is independent of any other edge in the remaining graph 900. The graph reasoning module 122 can therefore again apply the series-type collapsing rule to combine edges 902 and 612, thereby producing a new edge 1002 in a remaining graph 1000 of FIG. 10.

Figure 11:
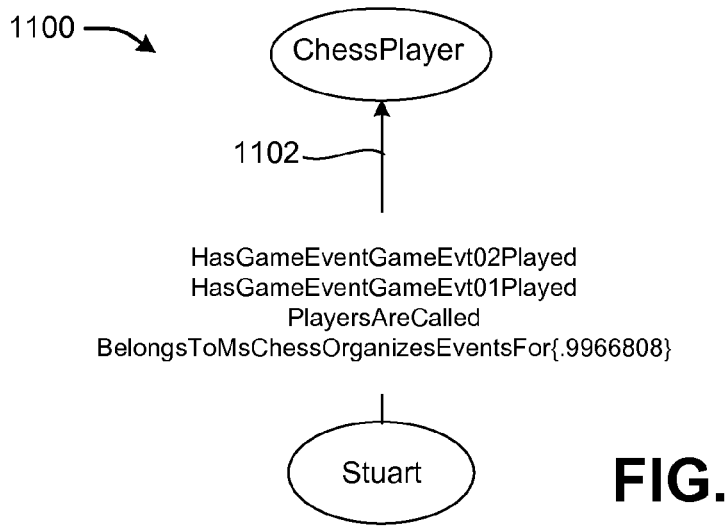

At this juncture, note that edges 1002 and 806 are now disposed in parallel in a manner that is independent of any other edge in the remaining graph 1000. The graph reasoning module 122 can therefore again apply the parallel-type collapsing rule to combine edges 1002 and 806, thereby producing a new edge 1102 in a remaining graph 1100 of FIG. 11. At this final juncture, there are no other edges to collapse. The probability associated with the final edge 1102 provides an answer to the query, namely the probability that the person named Stuart is a chess player (here, corresponding to the value 0.9966808).

Throughout the above-described collapsing processing, the figures have assigned labels to the collapsed edges which represent conglomerations of the labels assigned to the edges being collapsed. This is merely one approach that can be used to identify the collapsed edge. In this approach, the final edge 1102 has a label which aggregates each of the component edges that has contributed to produce the final edge 1102.

Figure 12:
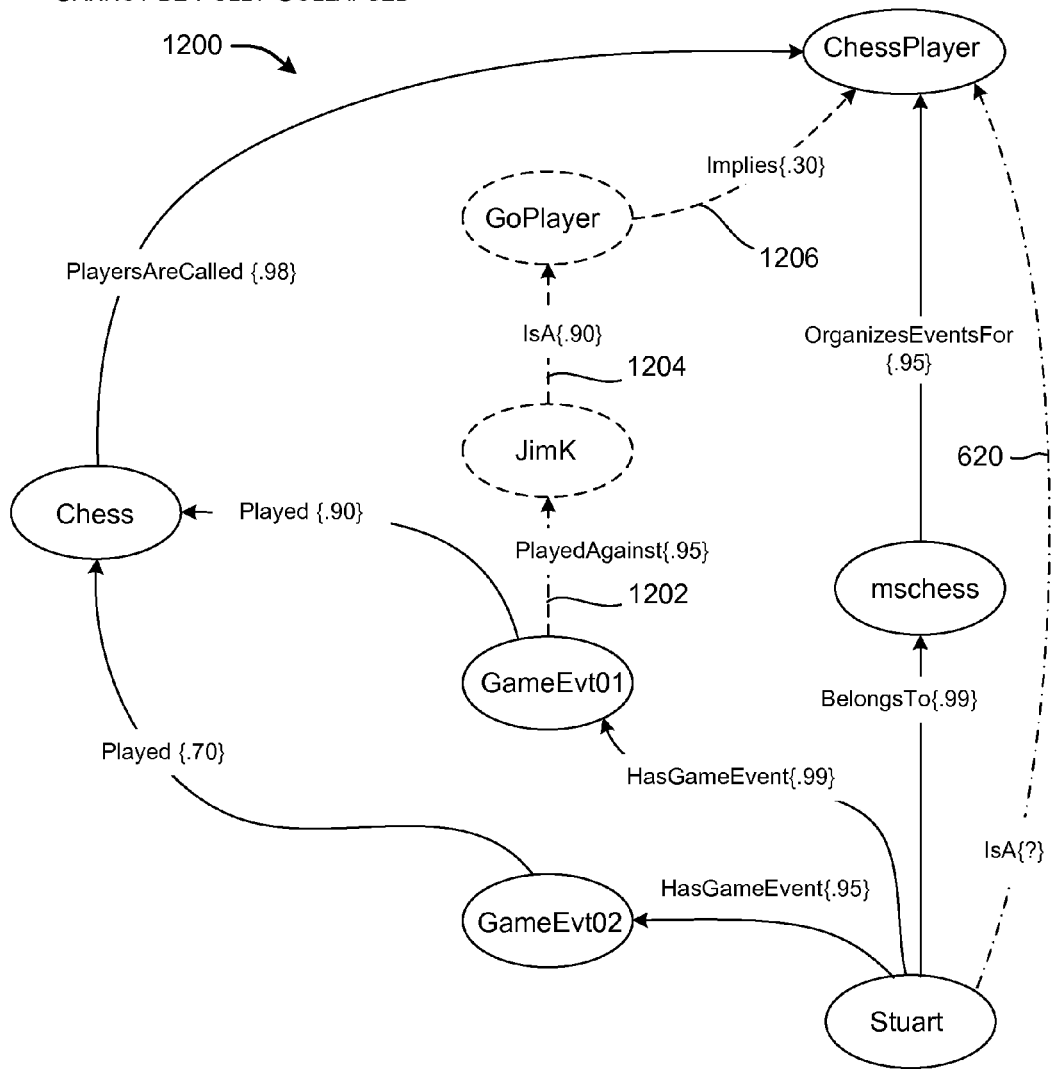
FIG. 12 shows a semantic graph in which all edges cannot be collapsed in the manner shown in FIGS. 8-11.

FIG. 12 shows a semantic graph 1200 that represents a slightly more complicated version of the semantic graph 600 of FIG. 6. This graph serves as a demonstration that it may not be possible in all instances to collapse all edges in a semantic graph into a single edge that provides a direct answer to a query (as was the case in FIG. 11).

More specifically, in the case of FIG. 12, two new nodes and three new edges have been added. A first new edge 1202 indicates that there is a certain probability that the first game (GameEvt01) was played against a person identified as JimK. A second new edge 1204 indicates that there is a certain probability that JimK plays the game of Go. And a third new edge 1206 indicates that there is an implication that players of the game Go are also chess players.

The new edges represent a new path through the semantic graph 1200 by which it can be established that Stuart is a chess player. To formally mine the semantic graph 1200 for the relationship represented by the new path, the QRFM can formulate the following new query component, expressed in the SPARQL format as follows:

| RULE 3: |
| --- |
| SELECT ?A ?SportPlayer<br>WHERE{<br>    ?Person       <HasGameEvent>  ?Event.<br>    ?Event        <PlayedAgainst>  ?Friend.<br>    ?Friend      <IsA>            ?GamePlayer.<br>    ?GamePlayer <Implies>       ?SportPlayer.<br>    FILTER (?SportPlayer = "ChessPlayer")<br>} |

Figure 13:
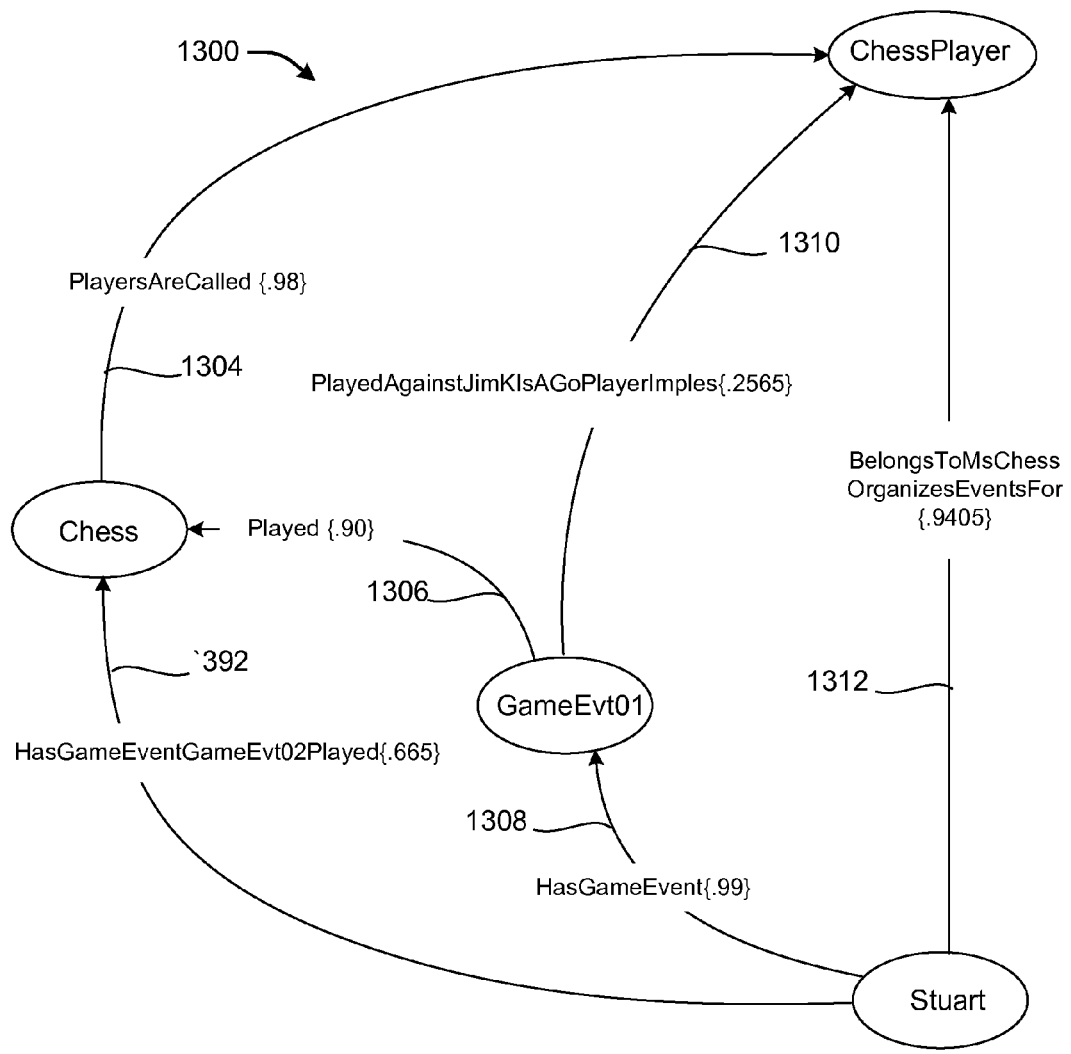
FIG. 13 shows a remaining graph that results from recursively collapsing edges, starting with the semantic graph of FIG. 12.

By recursively applying the series-type collapsing rule and the parallel-type collapsing rule, the graph reasoning module 122 can generate a remaining graph 1300 shown in FIG. 13. The remaining graph 1300 includes six edges (1302, 1304, 1306, 1308, 1310, and 1312) that cannot be collapsed any further. This is because these edges cannot be paired up in a way that will be independent of other edges. For example, the graph reasoning module 122 cannot apply the series-type collapsing rule to edges 1302 and 1304 because these edges are not independent of edge 1306.

To address this situation, the world state expansion module 506 (of FIG. 5) can enumerate the world states in the remaining graph 1300, each having a probability associated therewith. The word state expansion module 506 can then determine the answer to the query by summing the probabilities of the world states. For example, consider the slightly simplified remaining graph 1400 shown in FIG. 14 (which omits the edge 1310 shown in FIG. 13 to simplify explanation). The edges in the remaining graph portion are labeled with the letters A, B, C, D, and E. There are 32 possible world states because there are five states, since $2^5=32$.

Figure 14:
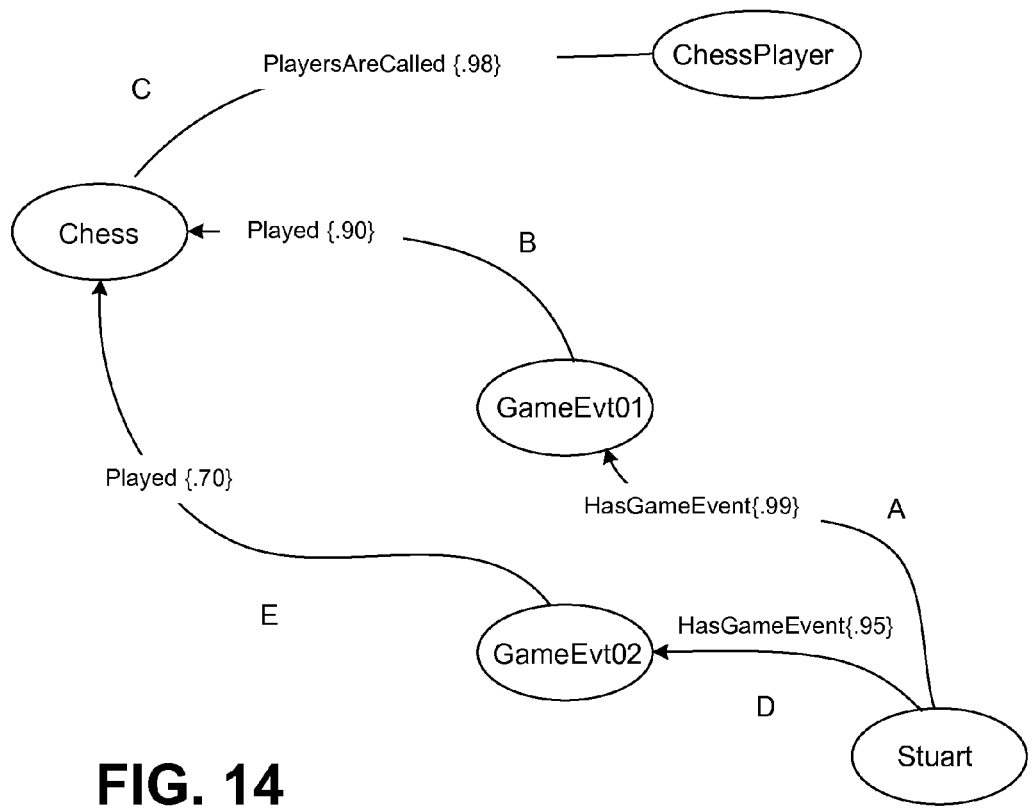
FIG. 14 shows a portion of a semantic graph for use explaining a world-state-expansion technique.

More specifically, FIG. 15 shows a table which enumerates all of the world states shown in FIG. 14. The first five columns in this table assign truth and falsity states to each of the edges, namely edges A, B, C, D, and E. For example the edge A (HasGameEvent) is true if the person named Stuart can be considered to have actually played a first game (GameEvt01). The next column in the table identifies whether the truth and falsity states assigned to the edges foreclose a valid path through the graph which can contribute to the answer. For example, no path can contribute to an answer whenever the edge C evaluates to false.

The next five columns identify the probabilities associated with edge states described in the first five columns. For example, the edge E is assigned the probability of 0.70 when it evaluates to true and 0.30 (e.g., 1−0.70) when it evaluates to false. The next column identifies the combined probability of each world state, which is produced by multiplying the probabilities of its five edge states together. The last column represents the probabilities that contribute to the final answer. If a world state evaluates to false with respect to a user's line of inquiry (as indicated in the "T/F" column), then it does not contribute to the answer. The world state expansion module 506 produces a final answer by summing the probabilities in the last column.

To clarify, it is pointed out that the semantic graph 1400 of FIG. 14 can also be solved by recursively collapsing edges in the manner described above. The explanation provided above was a demonstration of how the world-state-expansion technique can be applied to any remaining graph, including the type of remaining graph 1300 shown in FIG. 13 that cannot be solved by recursively collapsing edges. The world-state-expansion technique would involve an enumeration and analysis of 64 world states for the example of FIG. 13.

B. Illustrative Processes

FIGS. 16-20 show procedures that explain the operation of the semantic reasoning engine 102 of FIG. 1 in flowchart form. Since the principles underlying the operation of the semantic reasoning engine 102 have already been described in Section A, certain operations will be addressed in summary fashion in this section.

Figure 16:
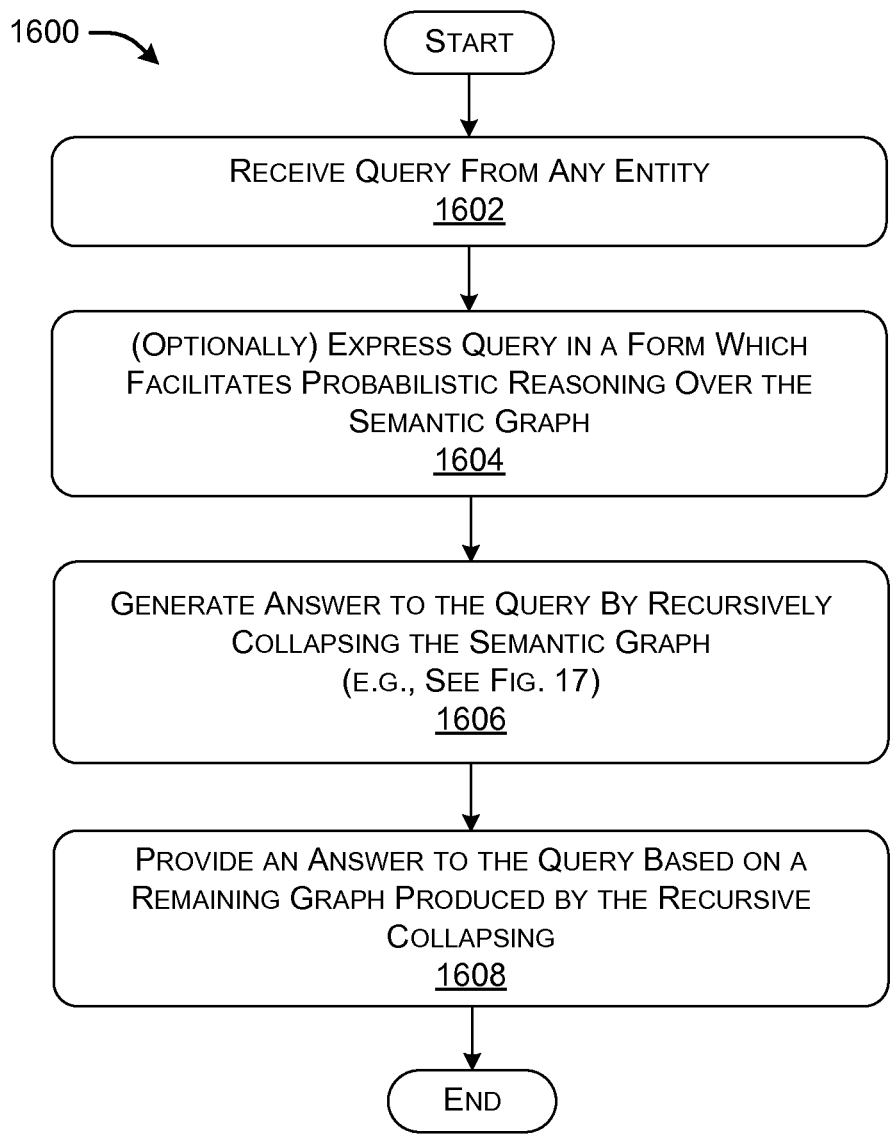
FIG. 16 is a flowchart that sets forth one manner of operation of the semantic reasoning engine of FIG. 1.

Starting with FIG. 16, this figure shows a procedure 1600 that presents an overview of the manner of operation of the semantic reasoning engine 102. In block 1602, the semantic reasoning engine 102 receives a query expressed in any format through any input mechanism. In block 1604, the semantic reasoning engine 102 optionally translates the query that is input into an appropriate form that can be used to interrogate the semantic graph. In block 1606, the semantic reasoning engine 102 generates an answer to the query by recursively collapsing edges in the manner specified above (if this is possible). In block 1608, the semantic reasoning engine 102 provides an answer based on the processing performed in block 1606.

Figure 17:
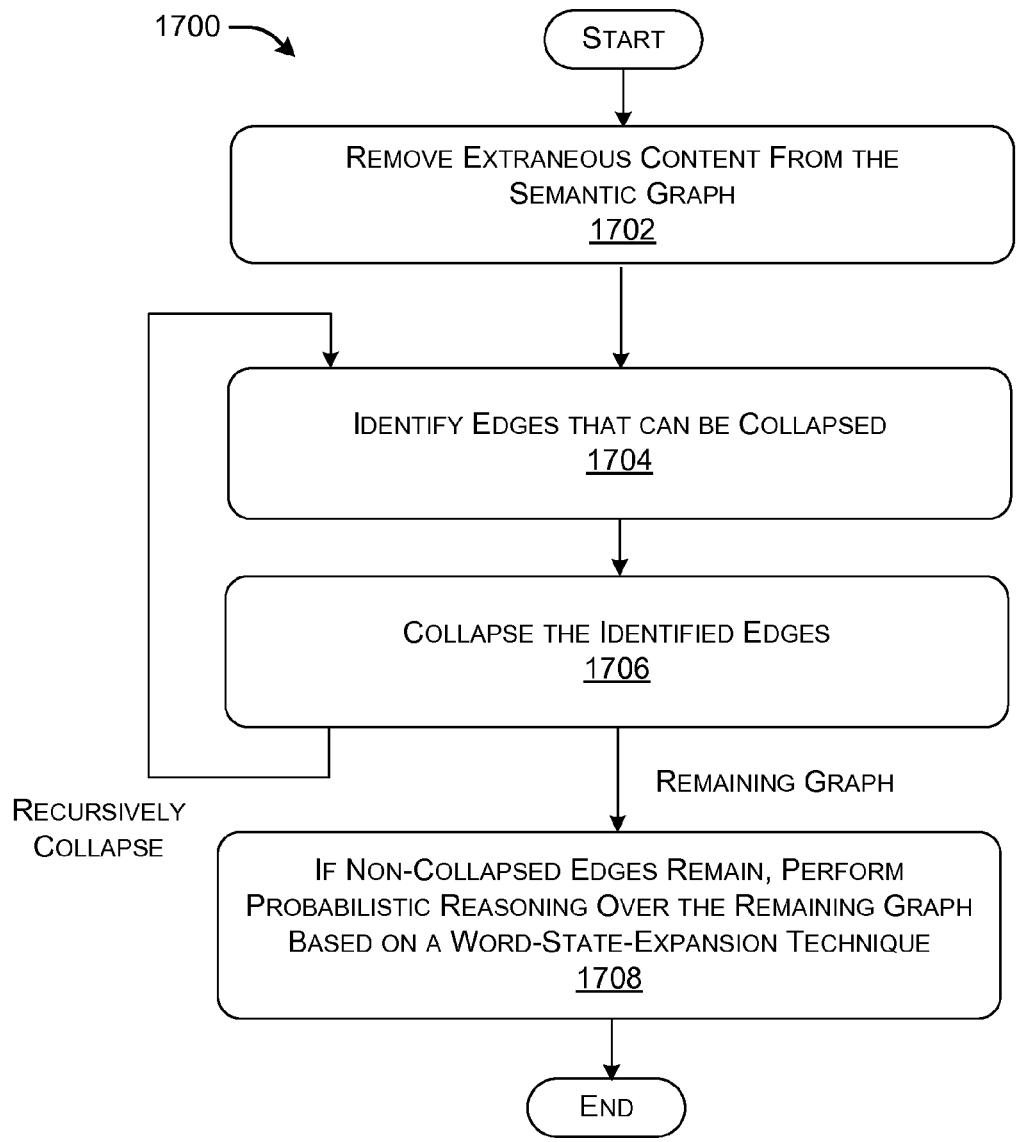
FIGS. 17 and 18 are flowcharts that show one manner of performing a recursive collapsing operation within the procedure shown in FIG. 16.

FIG. 17 describes a procedure which explains, in greater detail, the operation of the graph reasoning module 122 of FIG. 1. In block 1702, the graph reasoning module 122 removes extraneous content that does not contribute to answering the question. In block 1704, the graph reasoning module 1704 identifies whether there is any pair of edges that can be collapsed, where that pair of edges belongs to a path that can be used to address the query. In block 1706, the graph reasoning module 122 collapses the identified edge to produce a single new edge. The loop indicates that blocks 1704 and 1706 are repeated until no additional collapsible edges can be identified. In block 1708, the graph reasoning module 122 applies a world-state-expansion technique to solve any remaining graph that contains edges that cannot be collapsed.

Figure 18:
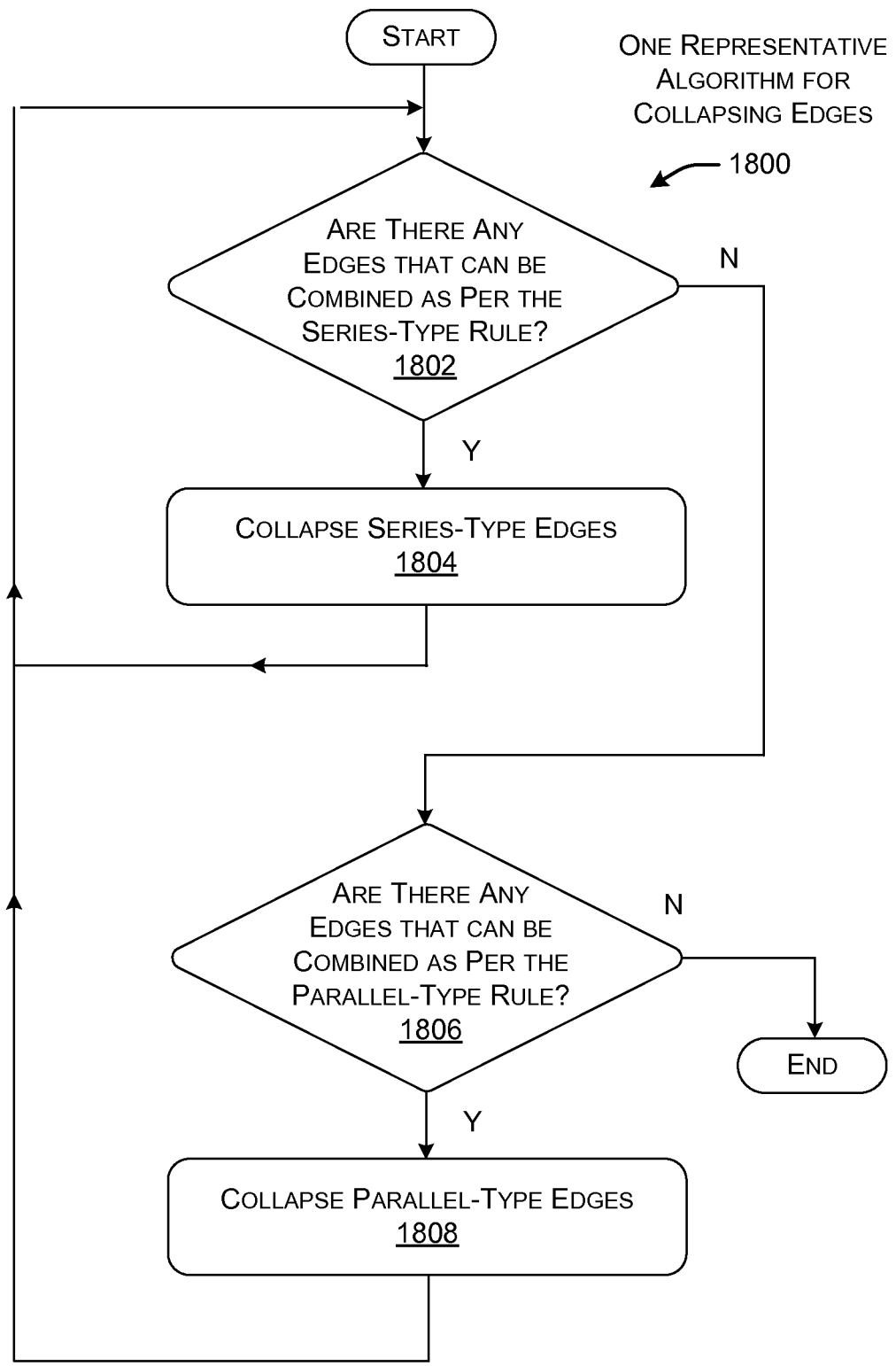

FIG. 18 describes a procedure 1800 that represents a still more particular implementation of the graph reasoning module 122 of FIG. 1. However, the technique described in this figure is representative rather than limiting; other approaches can be taken to recursively collapse the semantic graph. In block 1802, the graph reasoning module 122 determines whether there are any edges that can be combined using the series-type collapsing rule in the context of a particular line of inquiry. If so, in block 1804, the graph reasoning module 122 collapses the series-type edges. In block 1806, presuming that there are no series-type edges to collapse, the graph reasoning module 122 determines whether there are any parallel-type edges to collapse in the context of a particular line of inquiry. If this is true, in block 1808, the graph reasoning module 122 collapses the parallel-type edges to produce a single edge. The flow then advances back to block 1802 in which it is again determined whether the remaining graph contains any edges that can be collapsed using the series-type collapsing rules. This may be true because the collapsing performed in block 1808 may have exposed additional series-type edges that can be collapsed.

Figure 19:
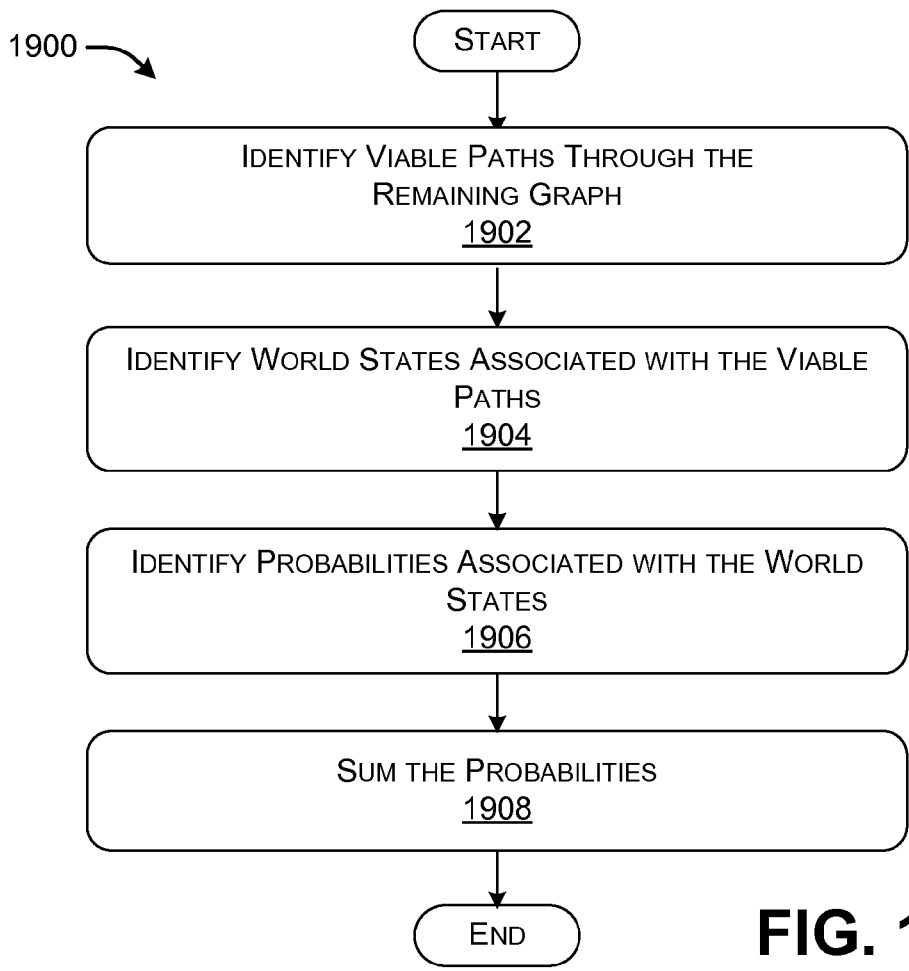
FIG. 19 is a flowchart that shows one manner of operation of a world-state-expansion technique.

FIG. 19 shows a procedure 1900 which describes the world-state-expansion technique. In block 1902, the graph reasoning module 122 identifies viable paths through the remaining graph and the edges associated therewith (e.g., edges A, B, C, D, and E shown in FIG. 13). In block 1904, the graph reasoning module 122 identifies world states associated with the viable paths, e.g., by assigning true and false states to the component edges in the paths. In block 1906, the graph reasoning module 122 identifies total probabilities associated with the world states. In block 1908, the graph reasoning module 122 sums the probabilities determined in block 1906 to determine a final probability associated with the answer to the query.

Figure 20:
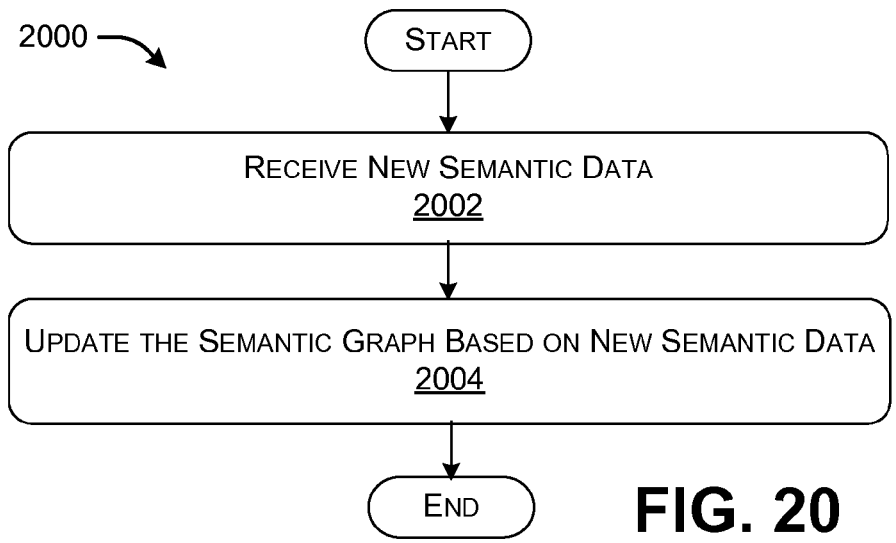
FIG. 20 is a flowchart that shows one manner of updating a semantic graph.

FIG. 20 shows a procedure 2000 for updating the semantic graph provided in the data store 114. In block 2002, the information maintenance module 108 receives semantic data from any source or combination of sources. In block 2004, the graph formulation module 112 updates the semantic graph based on the newly received semantic data.

As a final topic, the semantic reasoning engine 102 can be applied to any topic of inquiry in any environment. To cite merely one example, the semantic reasoning engine 102 can be applied in a health-related domain. In this context, a researcher can generate queries regarding patients, caregivers, diseases, and so on. In one mere representative case, a researcher may generate a query that seeks to determine the probability that patients of a certain doctor have been diagnosed with diabetes. Such a conclusion may depend on multiple paths through a semantic graph in the manner described above. If the question implicates multiple patients who have taken multiple tests, the problem can quickly become intractable without the recursive collapsing operation described above.

C. Representative Processing Functionality

FIG. 21 sets forth illustrative electrical data processing functionality 2100 (also referred to herein a computing functionality) that can be used to implement any aspect of the functions described above. For example, the processing functionality 2100 can be used to implement any aspect of the semantic reasoning engine 102. The processing functionality 2100 may also represent any aspect of local computing functionality (e.g., the local computing functionality 202, 302, or 402) that is used to submit a query to the semantic reasoning engine 102. In one case, the processing functionality 2100 may correspond to any type of computing device that includes one or more processing devices. In all cases, the electrical data processing functionality 2100 represents one or more physical and tangible processing mechanisms.

The processing functionality 2100 can include volatile and non-volatile memory, such as RAM 2102 and ROM 2104, as well as one or more processing devices 2106 (e.g., one or more CPUs, and/or one or more GPUs, etc.). The processing functionality 2100 also optionally includes various media devices 2108, such as a hard disk module, an optical disk module, and so forth. The processing functionality 2100 can perform various operations identified above when the processing device(s) 2106 executes instructions that are maintained by memory (e.g., RAM 2102, ROM 2104, or elsewhere).

More generally, instructions and other information can be stored on any computer readable medium 2110, including, but not limited to, static memory storage devices, magnetic storage devices, optical storage devices, and so on. The term computer readable medium also encompasses plural storage devices. In all cases, the computer readable medium 2110 represents some form of physical and tangible entity.

The processing functionality 2100 also includes an input/output module 2112 for receiving various inputs (via input modules 2114), and for providing various outputs (via output modules). One particular output mechanism may include a presentation module 2116 and an associated graphical user interface (GUI) 2118. The processing functionality 2100 can also include one or more network interfaces 2120 for exchanging data with other devices via one or more communication conduits 2122. One or more communication buses 2124 communicatively couple the above-described components together.

The communication conduit(s) 2122 can be implemented in any manner, e.g., by a local area network, a wide area network (e.g., the Internet), etc. The communication conduit(s) 2122 can include any combination of hardwired links, wireless links, routers, gateway functionality, name servers, etc., governed by any protocol or combination of protocols.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for performing probabilistic reasoning over a semantic graph, the semantic graph formed by a plurality of concepts connected together via probabilistic assertions, the method comprising:
   receiving a query at a computing device;
   identifying, by the computing device, edges within the semantic graph that can be collapsed based on one or more collapsing rules, to provide identified edges, wherein:
      the identified edges belong to at least one path through the semantic graph that addresses the query, and
      said one or more collapsing rules include a series-type collapsing rule specifying that two edges can be combined if the two edges are connected in series in a manner that is independent of other edges in the semantic graph;
   collapsing, by the computing device, the identified edges into a single edge having a resultant probability associated therewith;
   repeating, by the computing device, said identifying and said collapsing until no additional collapsible edges are identified in the semantic graph, to provide a remaining graph; and
   generating an answer to the query based on the remaining graph.

2. The method of claim 1, further comprising:
   expressing, by the computing device, the query in a form which is a template for said at least one path through the semantic graph.

3. The method of claim 1, further comprising:
   extracting, by the computing device, the semantic graph from a larger graph by removing extraneous semantic content from the larger graph that is not pertinent to the query.

4. The method of claim 1, wherein said one or more collapsing rules further include a parallel-type collapsing rule specifying that two edges can be combined if the two edges are connected in parallel in a manner that is independent of other edges in the semantic graph.

5. The method of claim 4, wherein said identifying comprises determining whether there are edges that satisfy the series-type collapsing rule, and if no edges are found that satisfy the series-type collapsing rule, determining whether there are edges that satisfy the parallel-type collapsing rule.

6. The method of claim 1, wherein the remaining graph has no non-collapsed edges, in which case the answer is provided by a probability associated with a final edge in the remaining graph.

7. The method of claim 1, wherein the remaining graph has non-collapsed edges, and wherein the method further comprises:
   identifying, by the computing device, paths that can be taken through the remaining graph to reach the answer;
   identifying, by the computing device, world states associated with the paths by enumerating different truth and false states associated with the paths;
   identifying, by the computing device, total probabilities associated with the respective world states; and
   summing, by the computing device, the probabilities to produce the answer.

8. The method of claim 1, wherein the semantic graph and the query pertain to a health-related domain.

9. The method of claim 1, further comprising:
   receiving, by the computing device, semantic data from at least one source; and
   updating, by the computing device, the semantic graph based on the semantic data.

10. A computing device for performing probabilistic reasoning over a semantic graph, the computing device comprising:
    a processor configured to execute computer-executable instructions; and
    memory storing computer-executable instructions for:
       providing a semantic graph formed by a plurality of concepts connected together via probabilistic assertions;
       receiving a query;
       identifying edges within the semantic graph that can be collapsed based on one or more collapsing rules, to provide identified edges, wherein:
          the identified edges belong to at least one path through the semantic graph that addresses the query, and
          said one or more collapsing rules include a series-type collapsing rule specifying that two edges can be combined if the two edges are connected in series in a manner that is independent of other edges in the semantic graph;
       collapsing the identified edges into a single edge having a resultant probability associated therewith;
       repeating said identifying and said collapsing until no additional collapsible edges are identified in the semantic graph, to provide a remaining graph; and
       generating an answer to the query based on the remaining graph.

11. The computing device of claim 10, wherein the memory further stores computer-executable instructions to express the query in a form which is a template of at least one path through the semantic graph that addresses the query.

12. The computing device of claim 10, wherein the memory further stores computer-executable instructions to extract the semantic graph from a larger graph by removing extraneous content from the larger graph that does not have a bearing on the query.

13. The computing device of claim 10, wherein said one or more collapsing rules further include a parallel-type collapsing rule specifying that two edges can be combined if the two edges are connected in parallel in a manner that is independent of other edges in the semantic graph.

14. The computing device of claim 10, wherein the remaining graph has non-collapsed edges, and wherein the memory further stores computer-executable instructions for:

identifying paths that can be taken through the remaining graph to reach the answer;

identifying world states associated with the paths by enumerating different truth and false states associated with the paths;

identifying total probabilities associated with the respective world states; and summing the probabilities to produce the answer.

15. A computer-readable storage device storing computer-executable instructions that, when executed by one or more processing devices of a computing device, causes the computing device to perform a method comprising:

receiving a query;

providing a semantic graph formed by a plurality of concepts connected together via probabilistic assertions;

identifying edges within the semantic graph that can be collapsed based on one or more collapsing rules, to provide identified edges, wherein:

the identified edges belong to at least one path through the semantic graph that addresses the query, and said one or more collapsing rules include a series-type collapsing rule specifying that two edges can be combined if the two edges are connected in series in a manner that is independent of other edges in the semantic graph;

collapsing the identified edges into a single edge having a resultant probability associated therewith, repeating said identifying and said collapsing until no additional collapsible edges are identified in the semantic graph, to yield a remaining graph; and generating an answer to the query based on a the remaining graph.

16. The computer-readable storage device of claim 15, wherein the remaining graph has non-collapsed edges, and further storing computer-executable instructions for:

identifying paths that can be taken through the remaining graph to reach the answer;

identifying world states associated with the paths by enumerating different truth and false states associated with the paths;

identifying total probabilities associated with the respective world states; and summing the probabilities to produce the answer.

17. The computer-readable storage device of claim 15, wherein said one or more collapsing rules further include a parallel-type collapsing rule specifying that two edges can be combined if the two edges are connected in parallel in a manner that is independent of other edges in the semantic graph.

18. The computer-readable storage device of claim 17, wherein said identifying comprises determining whether there are edges that satisfy the series-type collapsing rule, and if no edges are found that satisfy the series-type collapsing rule, determining whether there are edges that satisfy the parallel-type collapsing rule.

19. The computer-readable storage device of claim 15, further storing computer-executable instructions for expressing the query in a form which is a template of at least one path through the semantic graph that addresses the query.

20. The computer-readable storage device of claim 15, further storing computer-executable instructions for extracting the semantic graph from a larger graph by removing extraneous content from the larger graph that does not have a bearing on the query.

* * * * *